United States Patent [19] [11] Patent Number: 4,854,468
Dahlquist, II et al. [45] Date of Patent: Aug. 8, 1989

[54] CUPHOLDER ADAPTIVE DEVICE

[76] Inventors: Charles W. Dahlquist, II, 10312 S. Vilas Dr.; Vaughn N. North, 2486 E. 10375 S., both of Sandy, Utah 84092

[21] Appl. No.: 38,220

[22] Filed: Apr. 14, 1987

[51] Int. Cl.⁴ ............................................. B65D 90/12
[52] U.S. Cl. ................................. 220/85 H; 229/1.5 H; 215/100 R; 215/100.5; 248/146; 248/346.1; 211/74; 211/75
[58] Field of Search ................................ 206/562, 563; 215/100 R, 100.5; 229/1.5 H; 220/85 H, 902, 90.4, 94 A; 248/146, 346, 346.1, 360; 211/74, 75; 269/47, 52, 900; D9/369, 455

[56] References Cited

U.S. PATENT DOCUMENTS

| 406,828 | 7/1889 | Fietsch, Jr. | 269/900 |
| 1,920,995 | 8/1933 | Legge | 229/1.5 H |
| 2,122,628 | 7/1938 | Tracy | 220/85 H |
| 2,593,648 | 4/1952 | Aukers et al. | 269/47 |
| 2,666,310 | 1/1954 | Hill | 248/146 |
| 2,698,155 | 12/1954 | Bowman | 211/75 |
| 2,948,452 | 8/1960 | Grogan et al. | 229/1.5 H |
| 3,065,873 | 11/1962 | Plate | 215/100 R |
| 3,090,478 | 5/1963 | Stanley | 220/85 H |
| 3,110,407 | 11/1963 | Dahl | 215/100 R |
| 3,698,675 | 10/1972 | Lerew et al. | 211/75 |
| 3,842,981 | 10/1974 | Lambert | 211/74 |
| 4,055,273 | 10/1977 | Jones | 215/100 R |
| 4,069,996 | 1/1978 | Koziol | 220/85 H |
| 4,088,250 | 5/1978 | Schaefer | 220/85 H |
| 4,678,149 | 7/1987 | Chase | D9/369 |
| 4,691,822 | 9/1987 | Malancon, Jr. | 220/94 A |
| 4,721,216 | 1/1988 | Kinder | 220/85 H |

FOREIGN PATENT DOCUMENTS 3027778  2/1982  Fed. Rep. of Germany ........ 269/52

Primary Examiner—David T. Fidei
Attorney, Agent, or Firm—Thorpe, North & Western

[57] ABSTRACT

A device for stabilizing and supporting a large cup whose base diameter exceeds the smaller diameter of a support receptacle such as is typically provided in a moving vehicle. The device includes a tubular support base having a diameter slightly smaller than the diameter of a standard can or cup receptacle and having an axial length of at least approximately ½ inch. A support plate is coupled at one side to a top rim of the tubular support base, the remaining side of the support plate being attached to a base rim of a truncated support cone having a diameter greater in size than the tubular diameter and being adapted in configuration for receiving the container or cup therein. A cantilevered configuration of the adaptor device imposes retention forces which increase with the increased weight contained in the supported cup.

10 Claims, 1 Drawing Sheet

CUPHOLDER ADAPTIVE DEVICE

BACKGROUND OF THE INVENTION

1. Field of the Invention

This invention pertains to a device for holding a cup in a cup support receptacle. More particularly, the present invention relates to a cup holding device which enables a cup to be supported in a receptacle whose size is too small to receive the base of the cup.

2. Prior Art

The growing popularity of convenience stores having gas and food products has developed a variety of product innovations. One such item has been the super-sized drink which is typically 32 liquid ounces in size or greater. Unfortunately, the cup dimensions for these larger drinks exceed the dimensions of standard drink receptacles provided in motor vehicles. These standard receptacles are generally sized to receive an aluminum can as typically used with soft drinks having a cylindrical shape and a diameter of approximately 2 and ⅛ inches. As a consequence, persons desiring to purchase a super-sized drink for consumption in the vehicle must either carry the drink in their lap or limit the container to the standard dimensions.

Furthermore, the adaption of large cups to have a smaller base suitable to fit in the standard receptacle is not feasible in most vehicle applications. Specifically, such configuration results in a top-heavy container when filled with liquid. With a moving vehicle, such a top-heavy condition is even more serious, subjecting the container to sudden lateral movements that could dislodge the cup.

In addition to the unsuitability of a top-heavy cup, limited space surrounding the receptacle operates as an impediment. Typically, the standard receptacle is located adjacent to a side wall which is too close to allow space for a wide top container. Because the anticipated use was for cylindrical drink cans with no lateral space requirements, provision for such lateral space was simply not contemplated as a need. Accordingly, even the use of a cup having a small enough base to fit in such standard receptacles could not be inserted simply because lateral space is not available.

OBJECTS AND SUMMARY OF THE INVENTION

It is therefore an object of the present invention to provide an adaptor which may be inserted in a standard receptacle and which provides a receptacle for supporting a larger cup.

An additional object of this invention is to provide an adaptor which can provide a support for a larger cup which is displaced from any side wall structure.

A further object of this invention is to provide an adaptor which is secured to and becomes part of a cup base and provides an extended insert to enable support of a larger cup at the standard receptacle.

These and other objects are provided in an adaptor comprising a tubular support base having a diameter slightly smaller than the diameter of the cupholder recess and an axial length of approximately one half inch or greater. This support base is attached at one side to a support plate which is attached at its other side to a truncated support cone. The support cone has a smaller base rim whose diameter is greater in size than the tubular diameter of the support base. Gripping means may be provided within the truncated support cone to catch or interlock with a container or cup inserted therein such that the device and cup are retained together during use.

Other objects and features of the present invention will be apparent to those skilled in the art based upon the following detailed description, taken in conjunction with the drawings.

DETAILED DESCRIPTION OF THE INVENTION

Figure 1:
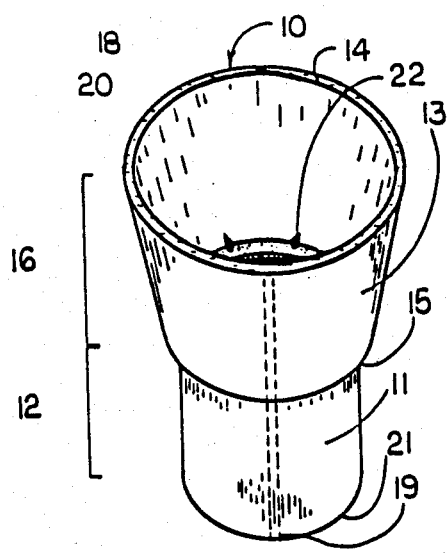
FIG. 1 is an elevated perspective view of a cup adaptor constructed in accordance with the present invention.
Figure 3:
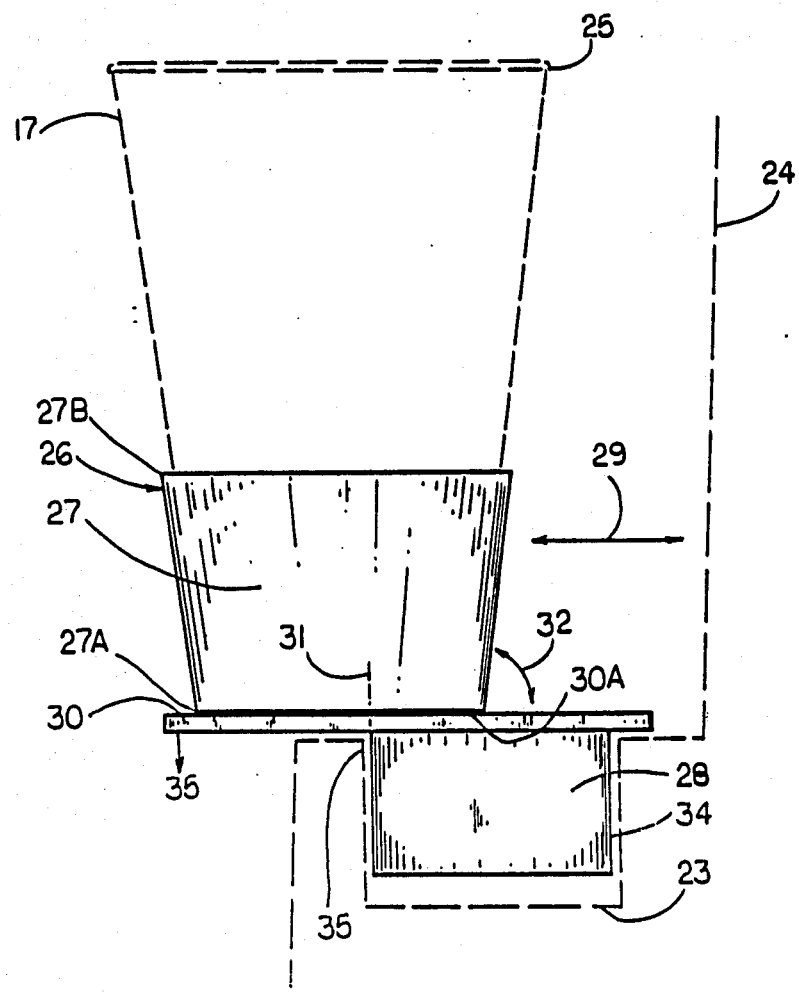
FIG. 3 shows a second embodiment of the subject invention with a graphic representation in phantom line showing a drink receptacle and the adaptor device seated therein.

FIG. 1 shows an adaptor device 10 for stabilizing and supporting a cup or large container (illustrated as item 17 in FIG. 3). The adaptor device enables support with respect to a standard cup holder or recess 23 which has a smaller diameter than the base of the cup to be supported.

The device includes a cylindrical support base 11 which has a cylindrical diameter slightly smaller than the diameter of the cupholder recess (item 23 in FIG. 3) to enable its insertion therein in a restrained manner. This cylindrical support base 11 may be solid or annular in construction and will typically have an axial length 12 of at least one half inch. Sufficient axial length is required in order to maintain the restrained configuration and prevent the cylindrical support base from tilting free from the cupholder recess. By having sufficient length, sidewall structure of the cylindrical base abuts against lateral support structure of the recess or receptacle 23 and prevents the cylindrical base from tilting free or dislodging inadvertently from the receptacle structure.

A cylindrical cross section for the support base is illustrated because conventional drink receptacles for soft drink cans and the like are circular in nature. A typical diameter for such a receptacle is 2⅜ inches, providing a close fit for a standard soft drink can of approximately 2½ inches in diameter. Equivalent structures of differing cross sections could be applied to implement the same principles of the present invention. For example, a square cross section for the support base could be provided where a square receptacle was being used. In general terms, therefore, the support base will consist of a tubular shape which may have variable cross sections, but which provides the desired lateral support to the rest of the device. Although the tubular cross section is illustrated as a cylinder in the figures, it is apparent that a square cross section could similarly be applied. In this event, the diagonal of the square cross section would correspond to the diameter of the cylindrical configuration. In each instance, the required lateral support is provided.

The drink container 17 is supported within a truncated support cone having a similar configuration and inclination angle as exists for a lower portion of the contained cup. The truncated support cone includes a top rim 14 and smaller base rim 15. The base rim has a diameter greater in size than the diameter of the support base 11. Lateral support structure of the support cone extends an axial length 16 of at least one inch to provide adequate support to the contained cup.

The support base and truncated cone are respectively coupled at opposite sides of a support plate 18. In FIG. 1, for example, one side of the top rim of the cylindrical support base 11 is attached at the base side of the support plate 18, while the remaining side of the support plate is coupled to the base rim 15 of the truncated cone. In this configuration, the support plate is disposed intermediate between the respective cylindrical support base and truncated cone, and also provides support to the container or cup 17 which is inserted within the cone. This support plate 18 may be formed in an annular configuration as shown in FIGS. 1 and 2, or may be formed as a solid disc or other shape adapted to integrate and connect the support base 11 and cup containing device 13.

Figure 2:
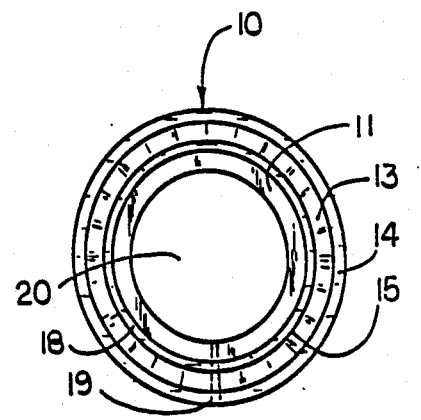
FIG. 2 is a bottom view of the adaptor device shown in FIG. 1.

Use of the annular configuration for the support disc as shown in FIGS. 1 and 2 enables use of a vertical slot or opening 19 (shown in phantom line). This slotted opening extends upward from a lower terminal rim 21 of the support base, through one annular side of the support plate 18 and continuing upward through the top rim 14 of the support cone. The extension of this slot along the total vertical height of the subject device enables expansion of the component diameters in response to insertion of a cup having a slightly larger base diameter than the diameter of the cone. For example, a base diameter for the cone of 3¼ inches could be expanded by a cup diameter of 3⅜ inches by pushing the cup securely into the base of the cone. The existence of the slotted opening 19 allows the truncated cone to enlarge and impose a fricational grip at the base of the inserted cup. The attached cone and support base then become interlocked with the cup or container during use and enable the user to freely remove or replace the adaptor and contained cup at a conventional standard drink receptacle. The resistance of the adaptor against expansion can be controlled by the thickness and plastic composition selected, as well as the size of the annular opening 20. Less opening space increases the moment of inertia and stiffness of the disc and attached truncated cone against expansion. The opening of the annular disc is practically limited to be no greater than the base diameter to which the disc must be attached.

The frictional retention of a container 17 within the truncated cone 13 may be further enhanced by the use of gripping means 22 which are positioned at the interior base of the truncated cone near the juncture of the base rim 15 with the support plate 18. The illustrated gripping means 22 comprise teeth or barbs which interlock with a base rim of the container 17 to more strongly engage and interlock with the container. It will be apparent to those skilled in the art that other forms of gripping means may be applied to accomplish the desired result of an interlocking adaptor device and large-base cup.

Although FIGS. 1 and 2 illustrate an adaptive device wherein the support cone and tubular support base are in common vertical alignment, an offset configuration as illustrated in FIG. 3 may be preferred in some circumstances. For example, the phantom lines in FIG. 3 identify a receptacle or drink recess 23 which is positioned adjacent lateral wall structure 24 such as might exist in a vehicle where the drink receptacle 23 is next to a door or near a dashboard. In such circumstances, the top rim 25 of the cup or drink container may be a diameter which is too large to allow its positioning in a concentric or coaxial relationship with the receptacle 23. Accordingly, FIG. 3 discloses a second embodiment 26 wherein the truncated cone 27 is axially offset from the tubular support base 28 to provide a displacement gap 29 with respect to side wall structure 24. In this manner, drink container 17 may be positioned in the truncated cone 27 and will provide the same support as provided by the embodiment of FIGS. 1 and 2. In this instance, however, the construction includes a cantilevered configuration requiring increased axial length for the base 28. Generally, this length should be a least ¾ of an inch, as compared to the ½ inch minimum for the concentric or coaxial configuration of FIGS. 1 and 2. The cantilevered forces will be primarily applied within the support plate 30, which will need the necessary strength to resist the offset weight of the truncated cone and drink with respect to the tubular base 28. Where the contained cup holds as much as 44 ounces of liquid, this cantilevered force can be significant.

In the cantilevered configuration, it is possible to include a lateral slotted opening (represented by the edge line between points 27a and 27b). This slot is of the same configuration as the phantom slot shown in the truncated cone of FIG. 1, except that the slot is facing the left side of the page. Where the support plate 30 extends below and beyond the truncated cone toward the left side of Figure 3, the slotted opening would likewise extend along the side of the truncated cone 27 and through the disc structure 30. Alternatively, the support disc may terminate at other locations under the cone structure 27, such as at line 31 representing an extension of the side wall of the support base 28. In this instance, the truncated cone contains the slot 27a–b and enables the cone to more easily spread and grip a container or cup having a slightly larger diameter than the inner diameter of the cone structure. Support at the very base of the container is provided by a portion of the support plate 30a. Similarly, gripping teeth or other gripping means may be inserted within the cone structure to enhance frictional attachment of the subject device to a cup or container.

In addition to enabling the unrestricted placement of a large cup at a drink receptacle having limited side space, the cantilevered configuration of FIG. 3 provides the additional advantage of more secure retention of the oversized cup at the receptacle 23. This results by reason of the offset forces which develop a gripping contact at the remote side wall 34 from the truncated cone 27. Because of the cantilevered support, the weight of the drink contained within cup 17 applies a downward force 35 which tilts the tubular base 28, resulting in application of a locking force as shown at 34. The amount of force is roughly proportional to the weight of liquid contained within the cup 17. This provides the advantage of increased locking action at side surface 34, as well as opposing side 35 with the increased contents in the cup. In other words, the cantilevered structure provides the surprising result of variable gripping force for holding the adaptor device within the receptacle 23, based upon the amount of weight being supported. A full 44 ounce drink is provided much greater retention force at 34 and 35 than a container with only 20 ounces of fluid. This is significant because a 44 ounce container is very top heavy and much more susceptible to being dislodged from the receptacle 23. As the drink is consumed, the drink level is lowered and reduces the amount of top heaviness. This results in less restraint required at the receptacle 23.

Although many sizes of adaptor device may be selected, at least two sizes have shown particular advantage with respect to the proposed invention. A 32 ounce container having a height of approximately 5⅞ inches, a base diameter of approximately 3 1/16 inches and a top rim diameter of approximately 4½ inches may be well supported in an adaptor device constructed in accordance with the present invention wherein the base rim of the truncated cone has a diameter of approximately 3 to 3 1/16 inches, and the tubular diameter is approximately 2⅜ inches. Similarly, a 44 ounce drink container having a 3 5/16 base diameter and 4½ inch top rim diameter, with a height of approximately 7½ inches is well supported in an adaptor device wherein the base rim of the truncated cone is approximately 3¼ inches to 3 5/16 inches, the tubular diameter having a value of approximately 2⅜ inches.

It will be apparent to those skilled in the art that the other variations may be applied to the examples disclosed herein. Accordingly, the subject invention is to be limited only with respect to the following claims.

We claim:

1. A device for stabilizing and supporting a cup of large base diameter over a cup-holder recess having a smaller diameter than the base of the cup, said device comprising:
    a tubular support base having a diameter slightly smaller than the diameter of the cup-holder recess and having an axis with axial length of at least approximately one half inch;
    a truncated support cone having a top rim and smaller base rim, said base rim having a diameter greater in size than the tubular diameter, said support cone having an axis with axial length of at least approximately one inch;
    a support plate coupled at one side to a top rim of the tubular support base, the remaining side of the support plate being coupled to the base rim of the truncated cone, said support plate being thereby disposed intermediate between the respective tubular support base and truncated cone;
    the axes of the respective support cone and tubular support base being in offset but parallel vertical alignment.

2. A device as defined in claim 1, wherein the tubular diameter is at least approximately 2⅜ inches and the base diameter of the cone is approximately 3 to 3 1/16 inches.

3. A device as defined in claim 1, wherein the tubular diameter is at least approximately 2⅜ inches and the base diameter of the cone is approximately 3¼ to 3 5/16 inches.

4. A device as defined in claim 1, wherein the support plate comprises a solid disc approximately equal in diameter to the diameter of the base rim of the cone.

5. A device as defined in claim 1, wherein the support plate comprises an annular disc having an annular opening no greater in diameter than the tubular diameter and further comprising a slotted opening extending upward from the support base through one annular side of the support plate and continuing upward through the top rim of the support cone, said slot and device providing means for concurrent extension of the diameters of the support plate and cone in response to insertion of a cup having a slightly larger base diameter to develop a frictional grip at the base of the cup to retain the device as part of the cup during use.

6. A device as defined in claim 1, wherein the tubular base has an axial length of at least ¾ inch.

7. A device as defined in claim 1, wherein the support plate comprises an annular disc having an annular opening no greater in diameter than the tubular diameter and further comprises a slotted opening extending upward from the support plate and continuing upward through the top rim of the support cone, said slot and device providing means for extension of the diameter of the cone in response to insertion of a cup having a slightly larger base diameter to develop a frictional grip at the base of the cup to retain the device as part of the cup during use.

8. A device as defined in claim 1, wherein opposing interior edges of the base portion of the cone include gripping means operable to engage a base edge of the cup supported therein.

9. A device as defined in claim 8, wherein the gripping means comprise teeth positioned on an interior surface of the truncated cone near the junction of the base rim 15 and support plate 18.

10. A device for stabilizing and supporting a cup of large base diameter over a cup-holder recess having a smaller diameter than the base of the cup, said device comprising:
    a tubular support base having a diameter slightly smaller than the diameter of the cup-holder recess and having an axial length of at least approximately one half inch;
    a truncated support cone having a top rim and smaller base rim, said base rim having a diameter greater in size than the tubular diameter, said support cone having an axial length of at least approximately one inch;
    a support plate coupled at one side to a top rim of the tubular support base, the remaining side of the support plate being coupled to the base rim of the truncated cone, said support plate being thereby disposed intermediate between the respective tubular support base and truncated cone;
    wherein the support plate comprises an annular disc having an annular opening no greater in diameter than the tubular diameter and further comprises a slotted opening extending upward from the support plate and continuing upwards through the top rim of the support column, said slot and device providing means for extension of the diameter of the cone in response to insertion of a cup having a slightly larger base diameter to develop a frictional grip at the base of the cup to retain the device as part of a cup during use.

* * * * *